United States Patent [19]

Bussard et al.

[11] Patent Number: 4,598,975
[45] Date of Patent: Jul. 8, 1986

[54] MULTIPLE FIBER LINEAR ARRAY AND METHOD OF MAKING SAME

[75] Inventors: Anne B. Bussard; Wanda S. Hutchison, both of Salem, Va.

[73] Assignee: International Telephone and Telegraph Corporation, New York, N.Y.

[21] Appl. No.: 538,239

[22] Filed: Oct. 3, 1983

[51] Int. Cl.⁴ .................................................. G02B 6/04
[52] U.S. Cl. ................................ 350/96.24; 350/96.20; 350/96.25
[58] Field of Search ............... 350/96.15, 96.16, 96.19, 350/96.20, 96.24, 96.25, 320

[56] References Cited

U.S. PATENT DOCUMENTS

| 3,347,649 | 10/1967 | Singer | 350/96.24 X |
| 4,213,670 | 7/1980 | Milton et al. | 350/96.16 |
| 4,484,794 | 11/1984 | Witte | 350/96.16 |

FOREIGN PATENT DOCUMENTS 54-03557  1/1979  Japan ................................ 350/96.24
55-28083  2/1980  Japan ................................ 350/96.24

OTHER PUBLICATIONS

Aoyama et al, "Optical Demultiplexer for a Wavelength Division Multiplexing System", *Applied Optics*, vol. 18, No. 8, Apr. 1979, pp. 1253-1258.
Metcalf et al, "High-Capacity Wavelength Demultiplexer with a Large-Diameter Grin Rod Lens", *Applied Optics*, vol. 21, No. 5, Mar. 1982, pp. 794-796.

*Primary Examiner*—William L. Sikes
*Assistant Examiner*—Frank González
*Attorney, Agent, or Firm*—John T. O'Halloran; Robert P. Seitter

[57] ABSTRACT

A multiple fiber linear array comprising a pair of spaced apart plate members separated by spacers having a diameter no greater than the diameter of the largest fiber in the array and defining a passageway in which the fibers are inserted such that the fibers terminate adjacent one end of the passageway and are parallel and contiguous throughout a substantial portion of their length in the passageway.

16 Claims, 5 Drawing Figures

MULTIPLE FIBER LINEAR ARRAY AND METHOD OF MAKING SAME

The Government has rights in this invention pursuant to Contract No. F30602-81-C-0189 awarded by the Department of the Air Force.

FIELD OF THE INVENTION

This invention relates to a multiple fiber linear array and a method of making same and, more particularly, to such an array and method useful for precisely locating the fibers with respect to each other.

BACKGROUND OF THE INVENTION

In certain applications it is necessary to precisely locate a plurality of optical fibers relative to each other. For example, the information carrying capacity of a single optical fiber can be greatly increased by the use of multiplexing and demultiplexing techniques. One of these techniques utilizes wavelength division multiplexing and demultiplexing devices that depend on diffraction gratings to separate or combine light by wavelength. In a demultiplexing application, the diffraction grating separates light on the link fiber by wavelength and focuses each wavelength to a separate precisely located position where the receiver fibers are located. In a multiplexing application, the light on the transmitter fibers is combined and focused onto the link fiber. Thus, the fibers should be reliably, repeatably and accurately positioned to minimize insertion losses.

The basic approach to accurately and reproducibly positioning fiber has been to form a fiber array and to design the multiplexer and demultiplexer around the array. Known fiber arrays, however, have not satisfactorily provided the desired objects. Metcalf and Providakes (Applied Optics, Vol. 21, No. 5, Mar. 1, 1982) provide a device wherein the input and output fibers are aligned in a side-by-side array cemented between two microscope slides and polished. Interpretation of the data in their paper, however, shows that the spacing between the output peaks shown in FIG. 3 are not constant. This means that there were small, variable spaces between the fibers in the array which caused misalignment with the received light resulting in excess insertion losses.

SUMMARY OF THE INVENTION

It is an object of this invention to provide a multiple fiber linear array wherein all of the fibers are contiguous and thus accurately spaced relative to each other. It is also an object of this invention to provide a method for making such an array. Finally, it is an object of this invention to provide a linear fiber array that is relatively small, compact and rugged.

These objects are accomplished by providing a multiple fiber linear array comprised of first and second plate members each having a planar surface. The planar surfaces are arranged in side-by-side relationship with their planar surfaces adjacent each other. Parallel spacers are fixed to each of the planar surfaces such that the surfaces are spaced apart a predetermined distance. The spacers form a passageway bounded on opposite sides by the spacers and open on the sides adjacent the spacers. A plurality of optical fibers extend into the passageway and terminate at one of its open sides with a portion of the fibers extending beyond its other open side. The fibers are inserted into the passageway such that they are generally parallel to and contiguous with each other over a substantial length from the one open side extending toward the other.

This relationship of the fiber is preferably provided by inserting the fibers into the passageway one by one, starting with one fiber initially located along a line located on one side of the center line of the passageway and to the outside of the spacer on the same side of the center line.

DESCRIPTION OF THE DRAWING

For a better understanding of the invention, reference is made to the following description of a preferred embodiment thereof, taken in conjunction with the figures of the accompanying drawing, in which.

DETAILED DESCRIPTION OF A PREFERRED EMBODIMENT

Figure 1:
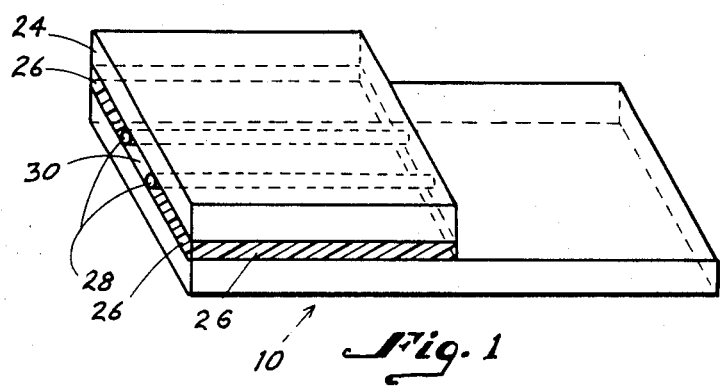
FIG. 1 is a perspective view of a multiple fiber holder in accordance with this invention.
Figure 2:
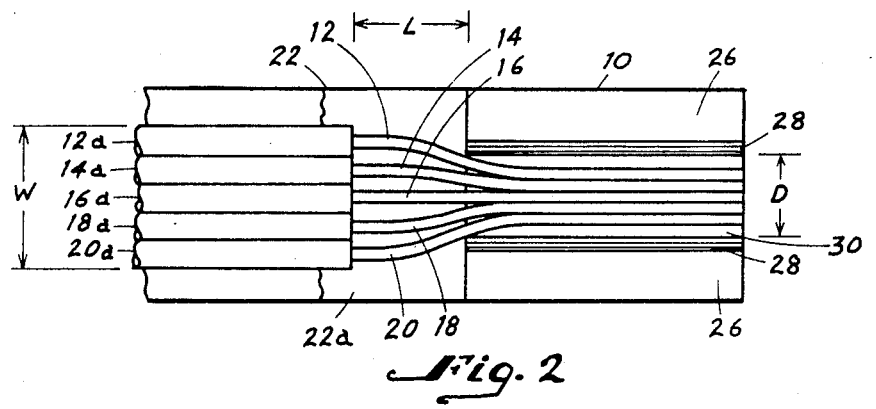
FIG. 2 is a top plan view of a multiple fiber linear array with a portion thereof removed for the sake of clarity.

FIGS. 1 and 2, in conjunction, illustrate a multiple fiber linear array comprising a fiber holder 10 and a plurality of optical fibers 12, 14, 16, 18 and 20 carried by the holder such that their ends are precisely and reproducibly located. The holder 10 comprises a pair of plate members 22 and 24 each having a planar surface arranged in side-by-side relationship such that the planar surfaces are adjacent each other. The plate members 22 and 24 are preferably pieces of glass with the use of microscope slides being convenient. As seen in FIG. 1, the plate member 22 is larger than the plate member 24 in that it is longer. It can also be seen that the widths of the plate members are approximately equal.

The plate members 22 and 24 are secured to each other by, for example, a suitable epoxy 26, with one edge of one member adjacent one edge of the other. Since their widths are approximately equal, three edges are, in fact, adjacent each other with a portion 22a of the plate member 22 extending beyond the plate member 24. The planar surface of portion 22a forms a support base as will be explained hereinafter.

The planar surfaces of the plate members 22 and 24 are spaced apart by parallel, spaced-apart spacers 28,28 which are fixed to the planar surfaces by the epoxy 26. The spacers 28,28 extend generally parallel to the long edges of the plate member 22 from the shorter edge thereof that is adjacent the edge of the plate member 24. In this way a passageway 30 is formed with a first open side adjacent the shorter edge of the plate member 22 that is adjacent an edge of the plate member 24 and with a second open side at the edge of the plate member 24 that is spaced from the shorter edge of the plate member 22, that is, adjacent the support base 22a. The spacers 28,28 are spaced apart a distance D sufficient to accommodate the optical fibers 12, 14, 16, 18 and 20 as will be more fully explained hereinafter. Moreover, the spacers are cross-sectionally dimensioned to space the planar surfaces of the plate members 22 and 24 a distance approximately equal to the cross-section diameter of the largest optical fiber to be included in the fiber array. Conveniently this is accomplished by using lengths of optical fiber as the spacers 28,28. These lengths of fiber are of the same diameter as the largest diameter fiber to be included in the array.

The optical fibers 12, 14, 16, 18 and 20 to be included in the array each include an unjacketed section that extends into the passageway 30 and that terminates at the first open side of the passageway. These fibers are secured in the passageway by epoxy. A small length L of the unjacketed fibers extend beyond the second open side of the passageway 30 where the unjacketed lengths become jacketed. The jacketed lengths 12a, 14a, 16a, 18a and 20a of fiber are placed contiguous with each other in parallel relationship on the support base 22a. The jacketed lengths of fiber are fixed to the support base 22a by any conventional technique such as by epoxy.

In the passageway 30 the fibers 12, 14, 16, 18 and 20 are contiguous with each other through a substantial portion of their length extending into the passageway from the first open side. Preferably, the fibers 12, 14, 16, 18 and 20 are contiguous through at least about sixty percent (60%) of their length in the passageway. Being contiguous in this way, the ends of the fibers adjacent the first open side of the passageway 30 are precisely located relative to each other. These ends as well as the adjacent edges of the plates 22 and 24 and the epoxy 26 as well as that fixing the fiber in the passageway are ground and polished and ready for use as a multiple fiber array. When the array is precisely located relative to a multiplexer or demultiplexer, each fiber is precisely located with respect to combined or separated light of different wavelengths.

In order to assure that the unjacketed fibers are parallel and contiguous throughout a sufficient length, the following ratios have been found appropriate for fibers having a 125 micron outer diameter and a 20 mil jacket diameter:

D/W should be greater than 0.45 but less than 0.70;
L/W should be greater than 0.70 but less than 1.00; and
D/L should be greater than 0.50 but less than 0.90.

In these expressions D is the distance between spacers 28,28, L is the distance between the second open end of the passageway and the jacketed optical fibers and W is the width of the jacketed fibers when placed side by side on the support base 22a. These ratios will probably vary slightly for fibers having different outer and jacketed diameters.

Figures 3, 4, 5:
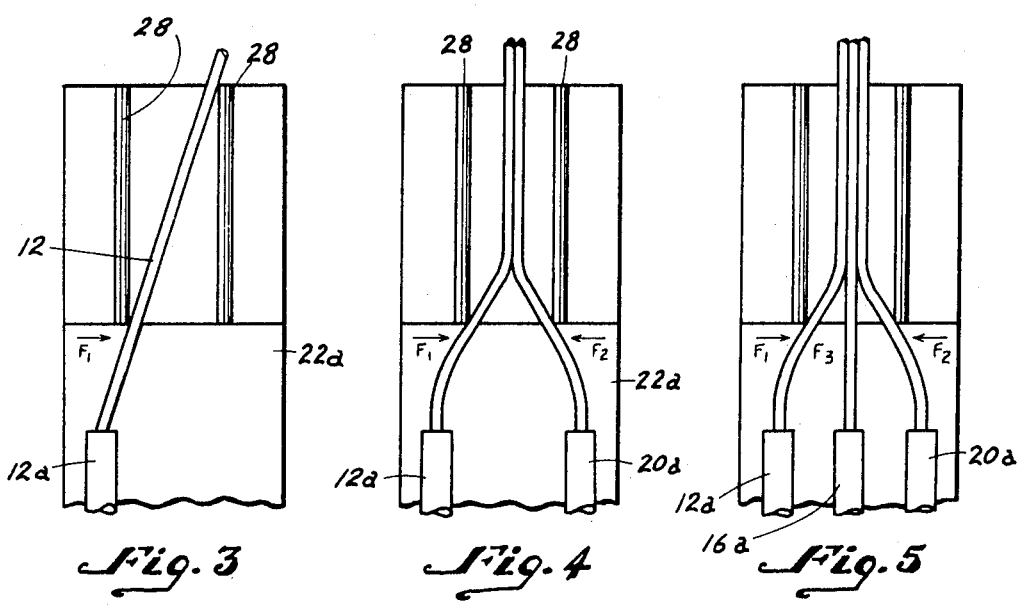
FIGS. 3-5 are partial section views illustrating the principles of one method of inserting fibers into the holder in accordance with this invention.

In making the multiple fiber linear array in accordance with this invention, a holder 10 is provided and the unjacketed lengths of optical fiber are inserted into the passageway 30 from the second open side such that the ends of the fibers are adjacent the first open side and so that the fibers are parallel and contiguous throughout a substantial portion of their length in the passageway. A technique for accomplishing this and explaining the underlying principles involved will be explained with reference to FIGS. 3-5. The fibers are inserted into the passageway one at a time starting with one of the outermost fibers 12 and then the other outermost fiber 20 or fiber 20 and then fiber 12. In FIG. 3, fiber 12 is inserted first and is inserted with the jacketed section 12a lying along a line spaced from the center line of the passageway 30 and just to the outside of the spacer 28 so that the fiber 12 first engages the adjacent end of the spacer 28 on the same side of the center line (where a compressive force $F_1$ is exerted) and extends diagonally to the opposite end of the other spacer 28, that is, the end on the other side of the center line. In FIG. 4, the fiber 20 is then inserted with the jacketed section 20a lying along a line spaced from the center line of the passageway 30 and just to the outside of the spacer 28 so that it engages the adjacent end of the spacer 28 on the same side of the center line (where a compressive force $F_2$ is exerted on it) and it engages the fiber 12. The force $F_2$ forces the fibers 12 and 20 together in a parallel and contiguous relationship. Forces $F_1$ and $F_2$ act in opposite directions on the fibers and have approximately equal magnitudes. As illustrated in FIG. 5, one of the intermediate fibers 14, 16 or 18 is inserted and the magnitude of forces $F_1$ and $F_2$ increases, forcing the fibers together more strongly. The force or the center fiber is balanced and equal to about zero. With each additional fiber the fibers are forced together over a longer length. Once the desired number of fibers have been inserted into the passageway the jacketed fibers 12a through 20a are moved along the support base 22a until the desired length of contiguous fibers are in the passageway 30. The jacketed fibers 12a through 20a are then epoxied in place as are the unjacketed fibers in the passageway. The ends of the unjacketed fibers as well as the adjacent plate member and epoxy surfaces are now ground and polished. For some applications it may be necessary to ensure that the fiber endfaces are polished perpendicular to the axis of the fibers.

In practice the fibers have been inserted starting with fiber 12 first being inserted with the jacketed section 12a lying along a line spaced from the center line of the passageway 30 and just to the outside of the spacer 28. Then, fibers 14, 16, 18 and 20 were inserted. This practice may be preferred since precise alignment is needed with respect to one fiber only. The description with respect to FIGS. 3-5 was carefully explained to provide an understanding of the forces operative to align the fibers.

While in the foregoing there has been described a preferred embodiment of the invention, it should be understood that various changes and modifications can be made without departing from the time, spirit and scope of the invention.

We claim:

1. A multiple fiber linear array comprising first and second plate members each having a planar surface, said plate members being arranged in side-by-side relationship wherein their planar surfaces are adjacent each other, parallel spacers are fixed to each of said planar surfaces such that said planar surfaces are spaced apart a predetermined distance and form a passageway bounded on opposite sides by said spacers and open on the sides adjacent said spacers, a plurality of optical fibers extend into said passageway and terminate at one open side thereof, a portion of said optical fibers extend beyond the other open side thereof, said extending portion of said optical fibers includes a jacketed and an unjacketed section and the portion in said passageway is unjacketed, said fibers are generally parallel to and contiguous with each other over a substantial length from said one open side of said passageway and extending toward said other open side thereof, the following approximations are generally followed in establishing the dimensions of the array:

$0.45 < D/W < 0.70$;
$0.70 < L/W < 1.00$; and
$0.50 < D/L < 0.90$ where D is the distance between said spacers, L is the distance between said other open end of said passageway and said jacketed optical fibers, and W is the width of said jacketed fibers when placed side by side.

2. A multiple fiber linear array in accordance with claim 1 wherein said predetermined distance is substantially equal to the largest diameter of any optical fiber extending into said passageway.

3. A multiple fiber linear array in accordance with claim 1 wherein said spacers are fiber members having a diameter substantially equal to that of any optical fiber extending into said passageway.

4. A multiple fiber linear array in accordance with claim 1 wherein said plate members are glass.

5. A multiple fiber linear array in accordance with claim 1 wherein said optical fibers are held in position in said passageway by epoxy.

6. A multiple fiber linear array in accordance with claim 1 wherein said optical fibers are contiguous throughout at least about 60% of the length of said passageway.

7. A multiple fiber linear array in accordance with claim 1 wherein said first plate is larger than said second plate in the direction of said passageway so that a portion of the planar surface of said first plate extends beyond said passageway and provides a support base, said extending portion of said optical fibers being expoxied to said support base.

8. A method of making a multiple fiber linear array, said method comprising the steps of:
   providing a multiple fiber holder having a pair of adjacent planar surfaces spaced apart by a distance equal to the diameter of the largest fiber in the array to be formed and arranged to form a passageway bounded on a first pair of opposite sides by parallel spacers and being open on a second pair of opposite sides; and
   inserting a plurality of unjacketed optical fibers into said passageway until the ends of said fibers are adjacent one of said open sides so that said fibers are parallel and contiguous throughout a substantial portion of their length in said passageway, a first fiber of said plurality of fibers being placed along a line located on one side of the center line of the passageway and on the outside of the spacer on the same side of the center line whereby the adjacent end of the spacer exerts a compressive force on the fiber and additional fibers of said plurality of fibers being inserted by placing the next fiber along a line such that it is contiguous with the previously inserted fiber.

9. A method in accordance with claim 8 wherein said fibers are inserted into said passageway one by one.

10. A method in accordance with claim 8 wherein a first fiber is inserted into said passageway and a second fiber is inserted into said passageway such that it exerts a compressive force on said first fiber, thereafter the additional fibers are inserted into said passageway in between said first and second fibers exerting additional compressive forces on said previously inserted fibers.

11. A method in accordance with claim 8 wherein epoxy is used to secure said fibers in said passageway.

12. A method in accordance with claim 8 wherein the ends of said fibers adjacent said one of said open sides are ground and polished.

13. A method in accordance with claim 8 wherein said holder is provided by epoxying spacers having a diameter no greater than that of the largest diameter fiber in the array in parallel relationship to each of the planar surfaces.

14. A method in accordance with claim 12 wherein said holder is provided with one of said planar surfaces being larger than the other to form a support base, and wherein said unjacketed optical fibers include jacketed portions that are epoxied to said support base.

15. A method in accordance with claim 8 wherein the last fiber inserted into the passageway is placed along a line on the other side of the center line of the passageway and on the outside of the other spacer.

16. A method of making a multiple fiber linear array, said method comprising the steps of:
   providing a multiple fiber holder having a pair of adjacent planar surfaces spaced apart by a distance equal to the diameter of the largest fiber in the array to be formed and arranged to form a passageway bounded on a first pair of opposite sides by parallel spacers and being open on a second pair of opposite sides;
   inserting a plurality of unjacketed optical fibers into said passageway until the ends of said fibers are adjacent one of said open sides so that said fibers are parallel and contiguous throughout a substantial portion of their length in said passageway;
   placing a first fiber along a line located on one side of the center line of the passageway and on the outside of the spacer on the same side of the center line whereby the adjacent end of the spacer exerts a compressive force on the fiber; and
   placing a second fiber along a line on the other side of the center line of the passageway and on the outside of the other spacer whereby the adjacent end of the other spacer exerts a compressive force on the second fiber which causes the second fiber to engage the first fiber and wherein additional fibers are placed on a line between the first two mentioned lines and are inserted between said first and second fibers.

* * * * *